United States Patent
Becker et al.

(10) Patent No.: US 10,266,270 B2
(45) Date of Patent: Apr. 23, 2019

(54) LOCKING SYSTEM FOR ARTICULATING AIRCRAFT SEAT

(71) Applicant: Cessna Aircraft Company, Wichita, KS (US)

(72) Inventors: Brad K. Becker, Derby, KS (US); Tyler Joseph Junge, Rapid City, SD (US); Brandon Ray Ramsey, Mulvane, KS (US)

(73) Assignee: Textron Innovations, Inc., Providence, RI (US)

( * ) Notice: Subject to any disclaimer, the term of this patent is extended or adjusted under 35 U.S.C. 154(b) by 159 days.

(21) Appl. No.: 15/241,195

(22) Filed: Aug. 19, 2016

(65) Prior Publication Data

US 2017/0050734 A1    Feb. 23, 2017

Related U.S. Application Data

(60) Provisional application No. 62/208,395, filed on Aug. 21, 2015.

(51) Int. Cl.
*B64D 11/06* (2006.01)

(52) U.S. Cl.
CPC .................. *B64D 11/064* (2014.12)

(58) Field of Classification Search
CPC .... B64D 11/064; B64D 11/0639; B60N 2/06; F16D 2127/08
USPC ..................... 188/72.2, 72.7, 72.9
See application file for complete search history.

(56) References Cited

U.S. PATENT DOCUMENTS

| | | | |
|---|---|---|---|
| 2,710,047 A | 6/1955 | Duppstadt | |
| 3,819,229 A | 6/1974 | Rogers, Jr. et al. | |
| 5,299,853 A * | 4/1994 | Griswold | B60N 2/233 188/DIG. 1 |
| 5,607,032 A * | 3/1997 | Rees | B60N 2/08 188/265 |
| 5,819,879 A * | 10/1998 | Lang | B66B 5/18 187/376 |
| 6,206,144 B1 * | 3/2001 | Di Bella | B62L 1/00 188/26 |
| 6,340,074 B1 * | 1/2002 | Lumpkin | F16D 65/18 188/26 |
| 6,425,464 B2 * | 7/2002 | Lumpkin | F16D 55/224 188/2 D |
| 6,439,077 B2 * | 8/2002 | Lumpkin | B62L 1/00 188/24.11 |
| 6,491,137 B2 * | 12/2002 | Lumpkin | B60T 11/046 188/24.15 |
| 6,520,297 B1 * | 2/2003 | Lumpkin | B60T 11/046 188/24.15 |
| 6,607,057 B2 * | 8/2003 | Lumpkin | B60T 11/046 188/18 A |

(Continued)

*Primary Examiner* — Thomas W Irvin
(74) *Attorney, Agent, or Firm* — Erise IP, P.A.

(57) ABSTRACT

Embodiments of the present disclosure provide a system for improved control of movement for adjusting position of an articulating aircraft seat. In an embodiment, a caliper brake engages a brake pad against a braking surface for stopping seat movement. The braking surface is linearly aligned with a desired direction of seat movement. A biasing mechanism maintains the brake pad against the braking surface to prevent movement of the seat. A release actuator counteracts the biasing mechanism for releasing the brake pad from the braking surface to allow seat movement.

13 Claims, 18 Drawing Sheets

(56) References Cited

U.S. PATENT DOCUMENTS

| | | | |
|---|---|---|---|
| 7,393,055 B2 | 7/2008 | Abt | |
| 8,770,353 B2 * | 7/2014 | Usui | F16D 65/18 |
| | | | 188/106 F |
| 9,322,445 B2 * | 4/2016 | Jensen | B66D 5/22 |
| 9,604,823 B2 * | 3/2017 | Sheynkman | B66B 19/02 |
| 2007/0246311 A1 * | 10/2007 | Schneider | F16D 55/22 |
| | | | 188/72.7 |
| 2014/0159436 A1 | 6/2014 | Iacobucci | |
| 2014/0299425 A1 * | 10/2014 | Schautt | B66B 5/18 |
| | | | 188/158 |
| 2014/0300145 A1 | 10/2014 | Beroth et al. | |
| 2015/0158401 A1 | 6/2015 | Keller et al. | |
| 2015/0217970 A1 * | 8/2015 | Schautt | B66B 5/18 |
| | | | 188/190 |

* cited by examiner

LOCKING SYSTEM FOR ARTICULATING AIRCRAFT SEAT

CROSS-REFERENCE TO RELATED APPLICATIONS

This application claims priority of U.S. Provisional Patent Application No. 62/208,395, filed Aug. 21, 2015, which is incorporated herein by reference.

BACKGROUND

1. Field of the Invention

Embodiments of the present disclosure relate generally to mechanical systems for securing and releasing moveable parts. More specifically, the invention relates to locking mechanisms for controlling motion of components used to adjust seat position.

2. Description of the Related Art

U.S. Pat. No. 2,710,047 to Duppstadt discloses an adjustable aircraft pilot seat for helicopters. The adjustment mechanism includes a spring loaded pin inserted through a hole of a rail with a cable for retrieving the pin from the hole against the bias of the spring.

U.S. Pat. No. 3,819,229 to Rodgers et al. discloses a rocker recliner chair with a locking mechanism between cams, including a torque tube that moves angularly about its long axis as the footrest is operated.

U.S. Pat. No. 7,393,055 to Abt discloses an aircraft passenger seat including a bell crank lever and a linear drive.

U.S. Patent Publication No. 2014/0300145 to Beroth et al. discloses a vehicle seat with simultaneous articulation of seat pan and seat back including a linear hydraulic locking device.

U.S. Patent Publication No. 2014/0159436 to Iacobucci discloses a reclining chair with hydraulic actuators.

U.S. Patent Publication No. 2015/0158401 to Keller et al. discloses an energy-absorbing seat assembly including a biasing member and a piston assembly.

SUMMARY

In an embodiment, a system for securing a moveable device in a plurality of positions is provided. The system includes a member on the movable device, the member extending along a linear path; a lever arm configured with a biasing mechanism to engage a brake pad against the member to prevent movement by the moveable device; and, a release actuator configured to pull the lever arm to counteract the biasing mechanism and disengage the brake pad from the member, thereby enabling motion of the moveable device that is: (i) along, or (ii) in parallel with the linear path.

In another embodiment, a locking system for an adjustable seat is provided. The system includes a releasable clamping device, the device being mechanically coupled to a seat base and configured to receive a clampable brake receiving member on the adjustable seat that slides on track tubes; a biasing mechanism maintaining the clamping device in engagement with the brake receiving member when in an engaged state; and, a release actuator for releasing the clamping device from the brake receiving member by acting against the biasing mechanism to enable a released state for sliding the adjustable seat.

In yet another embodiment, a braking system for adjusting position of an articulating aircraft seat is provided. The system includes a caliper mechanically coupled to a seat base, the caliper having an arm configured to rotate a ramped disc for pushing a brake pad against a braking surface and to counter-rotate the ramped disc for releasing the brake pad from the braking surface; a spring mechanically coupled to the caliper for biasing the arm to maintain the brake pad against the braking surface in an engaged state, thereby locking the seat in place; and, a cable mechanically coupled to the caliper and configured to counteract the spring to unlock the seat for moving.

DETAILED DESCRIPTION

Adjustable aircraft seats are designed with a serrated rail and a releasable pair of paws for grasping the serrated rail. The paws may be used to grasp and release the serrated rail for stopping and allowing movement, respectively. Disadvantages of using the serrated rail include the use of discrete serrations that provide limited adjustment positions and a loud braking noise when the paws dynamically contact the serrations.

Embodiments of the present disclosure provide a locking system for adjusting position of a moveable member. In certain embodiments, the moveable member is an articulating aircraft seat, which allows movement of seat components in a plurality of directions for adjusting a user's seating position. Traditional aircraft seats may include one or more rails for a seat to move along and paws for grasping the rails. The rails and paws may each include serrated surfaces for interfacing with one another. One drawback of the serrated surfaces is that they may contact each other dynamically, preventing rapid and precise cessation of movement and possibly producing a loud and unpleasant "ratchet" sound.

Figure 1:
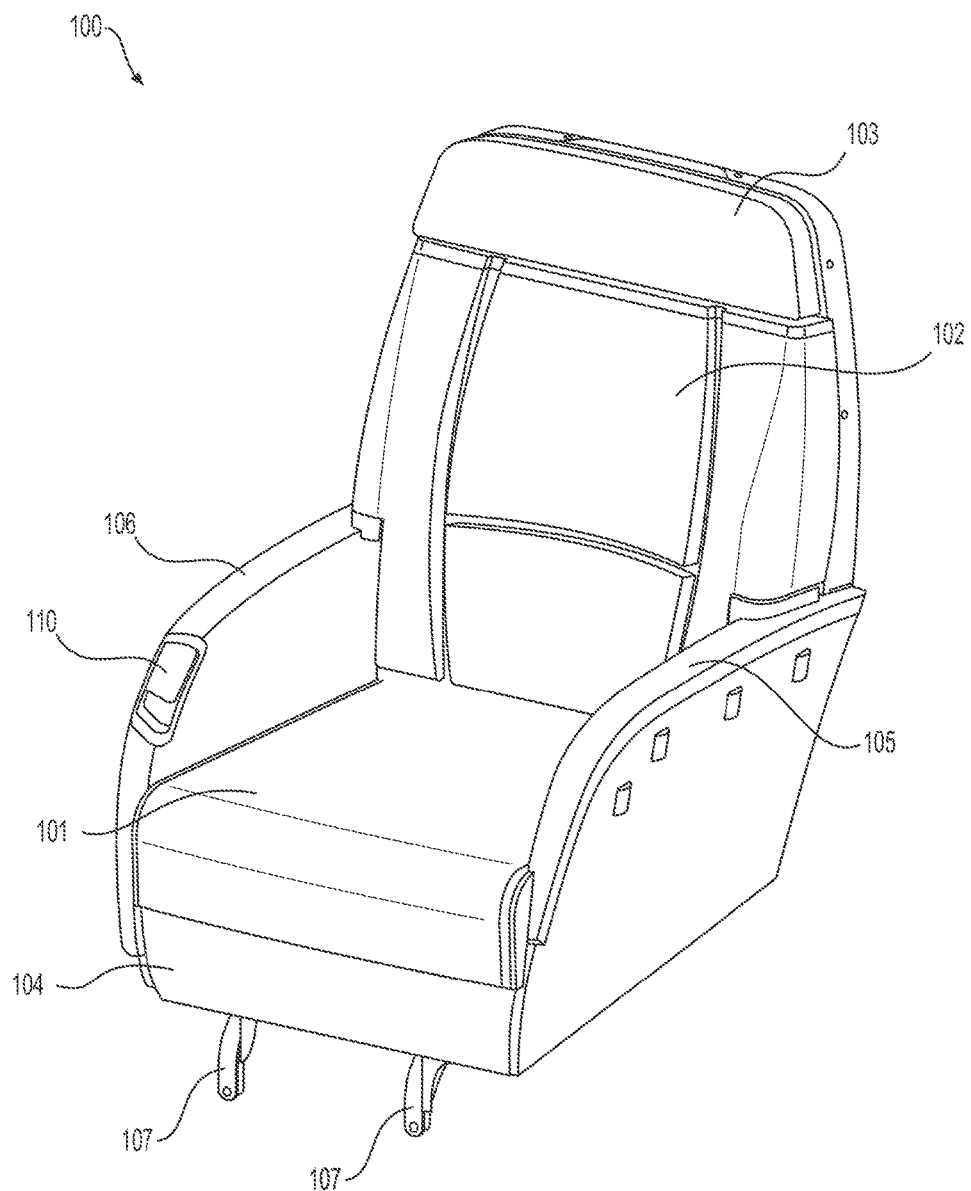
FIG. 1 is a perspective view of a seat for use with a locking system, in an embodiment.

FIG. 1 is a perspective view of an exemplary seat 100 for use with a locking system. Seat 100 includes a seat bottom 101, a seat back 102, a head rest 103, a foot rest 104, a left armrest 105 and a right armrest 106. Feet 107 may be used for mounting seat 100 to a floor for use onboard a vehicle, such as an aircraft for example. Seat 100 is for example an adjustable articulating seat such that seat back 102 may recline and foot rest 104 may extend forward. Seat 100 is an example of a moveable device that may be adjusted to a plurality of positions between and including upright and reclined. Right armrest 106 includes a control paddle 110 that may be used for controlling movement of components of seat 100.

Figure 2:
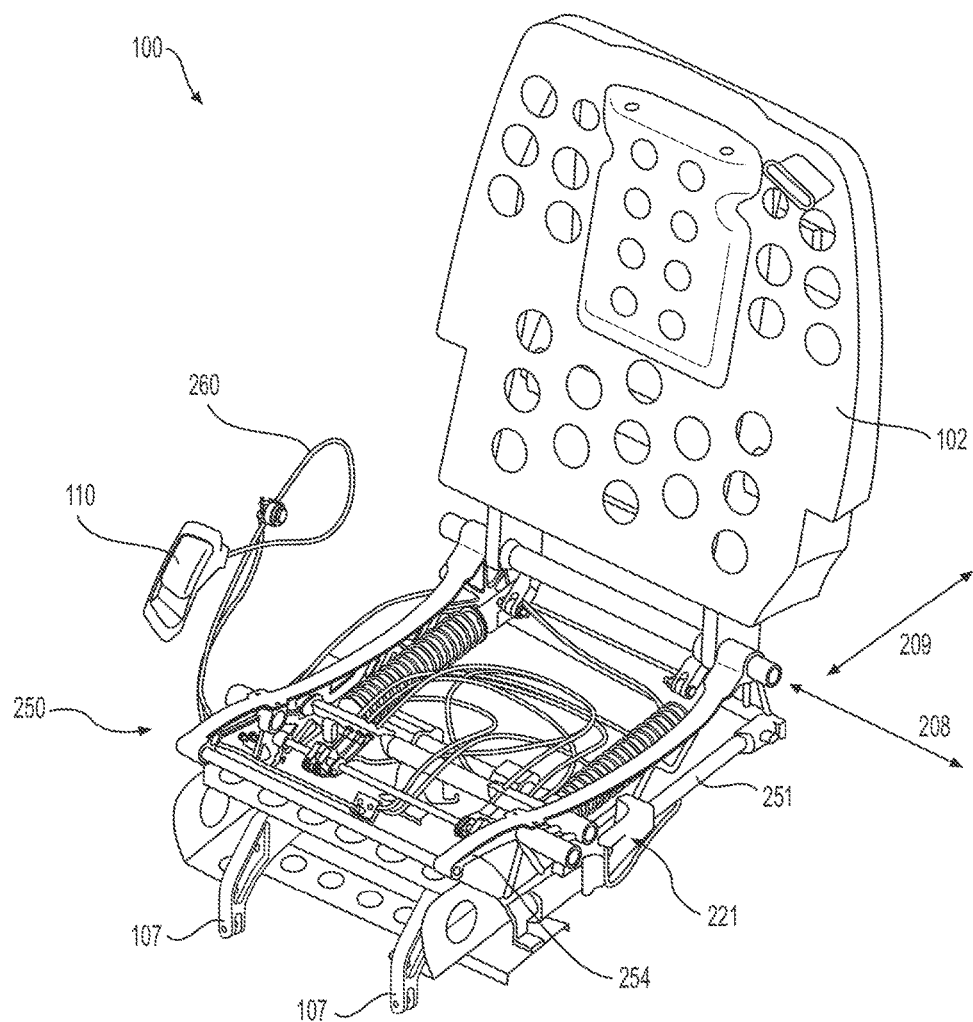
FIG. 2 is a perspective view of the seat of FIG. 1 with some components removed for viewing the seat's inner workings.

FIG. 2 is a perspective view of seat 100 with some components removed for viewing the seat's inner workings. In addition to seat back 102, feet 107, and control paddle 110, seat 100 includes a first longitudinal brake assembly 221 mounted to a seat base as described below in connection with FIG. 4. A bucket assembly 250 includes a bucket frame 254 that supports seat bottom 101 and is pivotably coupled to seat back 102 for rotating about a lateral axis 208.

First longitudinal brake assembly 221 is an example of a releasable clamping device, which may be configured to apply braking pressure to a braking surface. The braking surface may be any member configured for clamping by the releasable clamping device or for receiving braking pressure. In an embodiment, the braking surface is on a first brake plate 251. First brake plate 251 is for example mechanically coupled to bucket frame 254 for moving with bucket assembly 250. First brake plate 251 does not include serrations or serrated surfaces and is for example aligned with a longitudinal axis 209. As bucket assembly 250 is moved in a direction parallel with longitudinal axis 209, first longitudinal brake assembly 221 may be used to apply braking pressure to the braking surface of first brake plate 251 for holding bucket assembly 250 stationary. In an embodiment, movement along longitudinal axis 209 is in either a forward or aft direction with respect to the direction of a vehicle. First longitudinal brake assembly 221 is further described below in connection with FIGS. 6-13.

In an alternative embodiment, first longitudinal brake assembly 221 is mechanically coupled to bucket frame 254 for moving with bucket assembly 250, while first brake plate 251 is mechanically coupled to the seat base for remaining stationary.

FIG. 2 also depicts control paddle 110 and cables 260 connected thereto. Control paddle 110 is shown in isolation without right armrest 106 to enable viewing of cables 260, which may be located inside armrest 106, FIG. 1. Cables 260 connect control paddle 110 to first longitudinal brake assembly 221 to form a release actuator for controlling braking action, as further described below in connection with FIGS. 3, 4 and 5.

Figure 3:
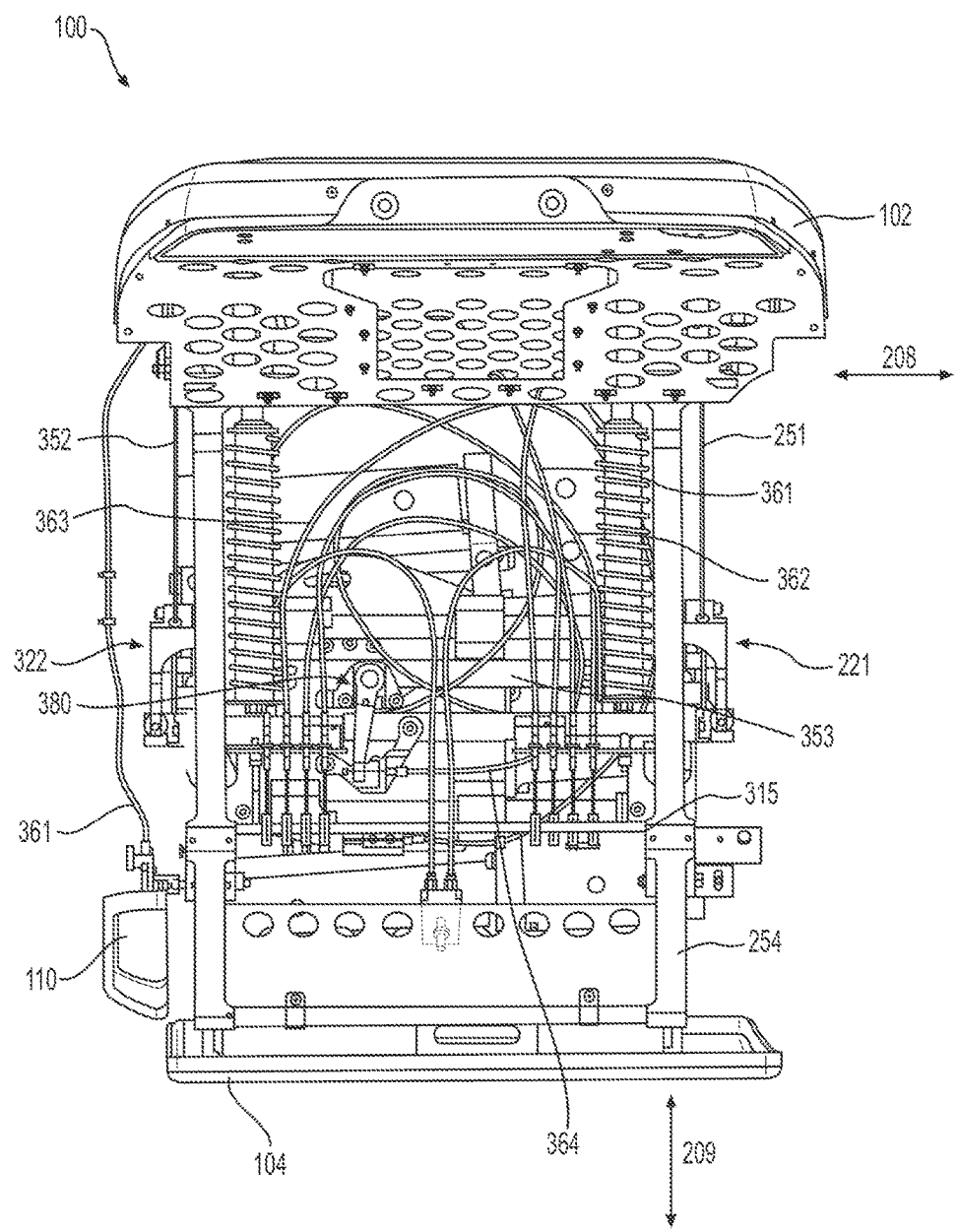
FIG. 3 is a top-down view of the seat of FIG. 2 with components removed for viewing the seat's inner workings.

FIG. 3 is a top-down view of seat 100 with components removed for viewing the seat's inner workings. In addition to first longitudinal brake assembly 221, seat 300 includes a second longitudinal brake assembly 322, located opposite first longitudinal brake assembly 221. Second longitudinal brake assembly 322 is configured in a mirror image of, and works in concert with first longitudinal brake assembly 221 for controlling motion of bucket assembly 250 in a direction parallel with longitudinal axis 209. A second brake plate 352 is configured along longitudinal axis 209 on the second side of seat 100, which provides second longitudinal brake assembly 322 a braking surface for applying braking pressure, similar to first longitudinal brake assembly 221 and first brake plate 251.

Control of second longitudinal brake assembly 322 may be provided using control paddle 110. A first cable 361 extends from control paddle 110 and mechanically couples to a control rod 315. Pulling first cable 361 using controlling paddle 110 may rotate control rod 315, thereby pulling a plurality of additional cables for controlling a respective plurality of components. The additional cables include a second cable 362 mechanically coupled to second longitudinal brake assembly 322 and a third cable 363 mechanically coupled to first longitudinal brake assembly 221. In this way, first longitudinal brake assembly 221 and second longitudinal brake assembly 322 may be simultaneously operated in unison using control paddle 110. Additional cables may for example be used to lock bucket assembly 250 in position for aircraft taxiing, takeoff, or landing, as further described below in connection with FIG. 4.

Referring again to FIG. 3, a lateral brake assembly 380 is an example of first longitudinal brake assembly 221 configured for controlling motion of bucket assembly 250 in a direction parallel with lateral axis 208. A third brake plate 353 may be configured parallel to lateral axis 208 to provide lateral brake assembly 380 a braking surface for applying brake pressure, similar to first brake assembly 221 and first brake plate 251. Lateral brake assembly 380 may be controlled using control paddle 110, FIG. 1. A fourth cable 364 mechanically couples the lateral brake assembly to control rod 315. When lifted to the activated position, control paddle 110 pulls first cable 361 to rotate control bar 315, thereby pulling fourth cable 364 to control lateral brake assembly 380 as further described below in connection with FIGS. 16-18.

Figure 4:
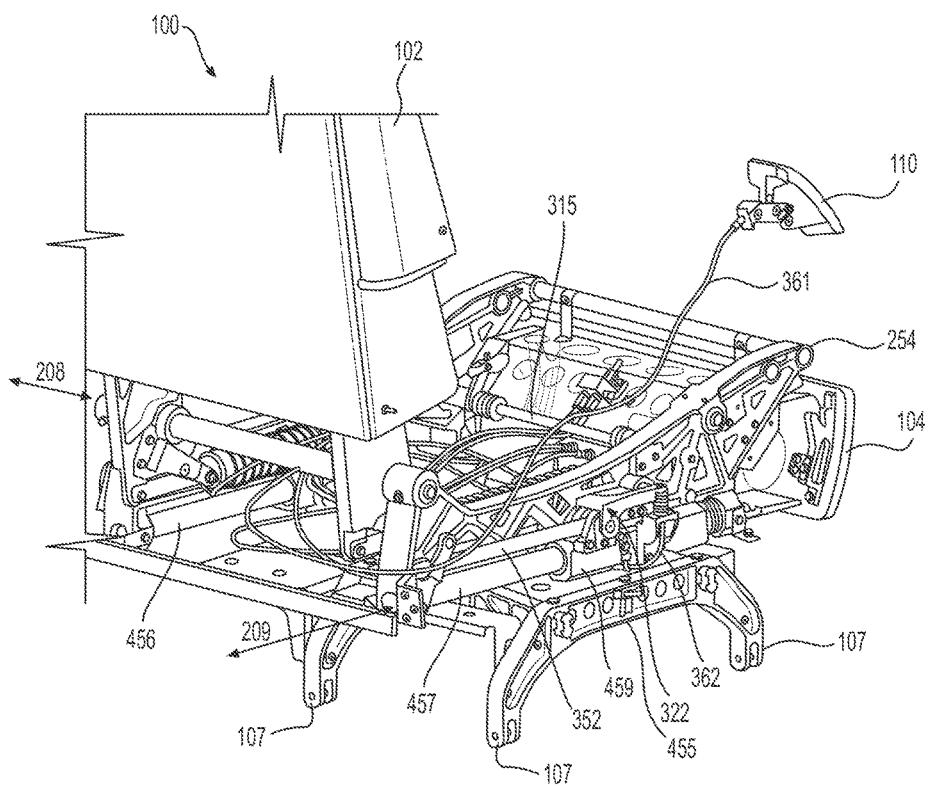
FIG. 4 is a perspective view of the side of a seat for use with a locking system, in an embodiment.

FIG. 4 is a perspective view of the second side of a seat 100 with components removed for viewing the seat's inner workings. Seat back 102 and bucket assembly 250 may be configured to move in the forward/aft direction parallel with longitudinal axis 209 via a first track tube 456 and a second track tube 457, which are mechanically coupled to bucket frame 254. Second track tube 457 is configured to pass through a second track block 459. First track tube 456 is similarly configured to pass through a first track block 658, FIG. 6, which is not visible in FIG. 4. In an embodiment, first track block 658 and second track block 459 are mechanically coupled to seat base 455 for remaining stationary, while first track tube 456 and second track tube 457 are configured for moving with bucket frame 254. Alternatively, first track block 658 and second track block 459 may be configured for moving with bucket frame 254, while first track tube 456 and second track tube 457 may be mechanically coupled to seat base 455 for remaining stationary. First cable 361 mechanically couples control paddle 110 to control bar 315, and second cable 362 mechanically couples control bar 315 to second longitudinal brake assembly 322. Locking pins may be controlled via cables mechanically coupled to control bar 315 for inserting into one of first or second track tube 456, 457 for locking bucket assembly 250 during for example taxiing, takeoff, or landing of an aircraft.

Figure 5:
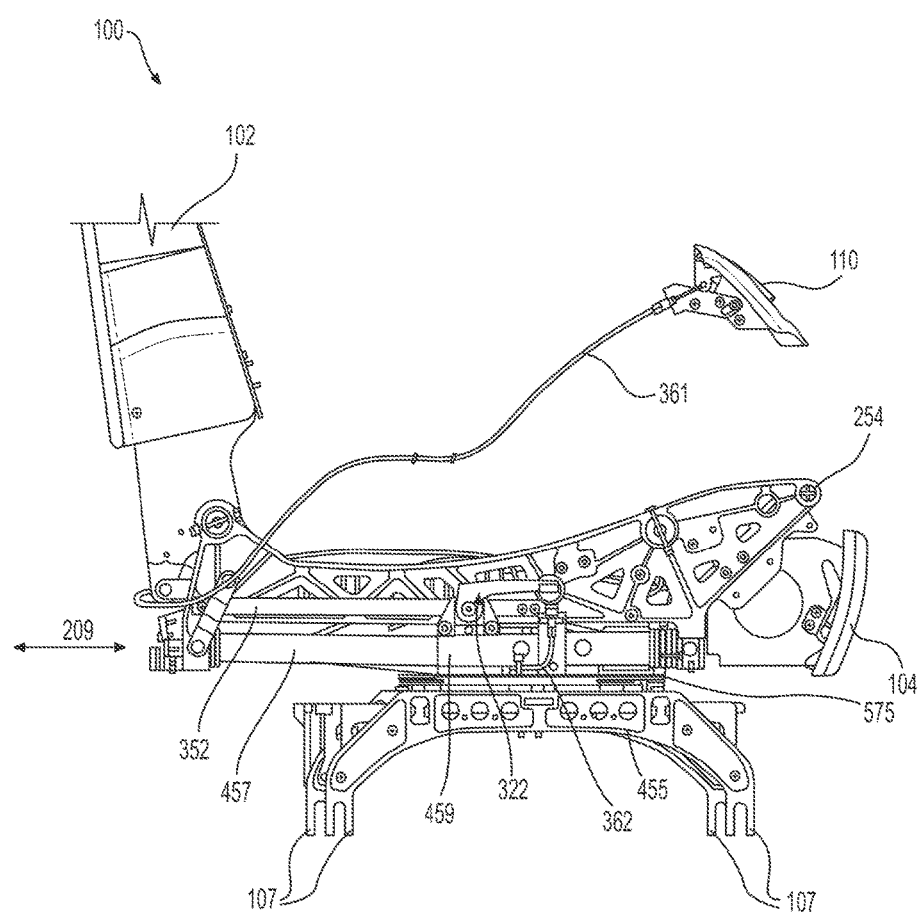
FIG. 5 is a side view of the seat of FIG. 4.

FIG. 5 is a side view of the second side of seat 100 with components removed for viewing the seat's inner workings. FIGS. 4 and 5 are best viewed together. Second longitudinal brake assembly 322 is mechanically coupled to second track block 459 and is configured to apply braking pressure to second brake plate 352. A swivel plate 575 may be configured between seat base 455 and bucket frame 254 to enable seat 100 to swivel about seat base 455.

Figure 6:
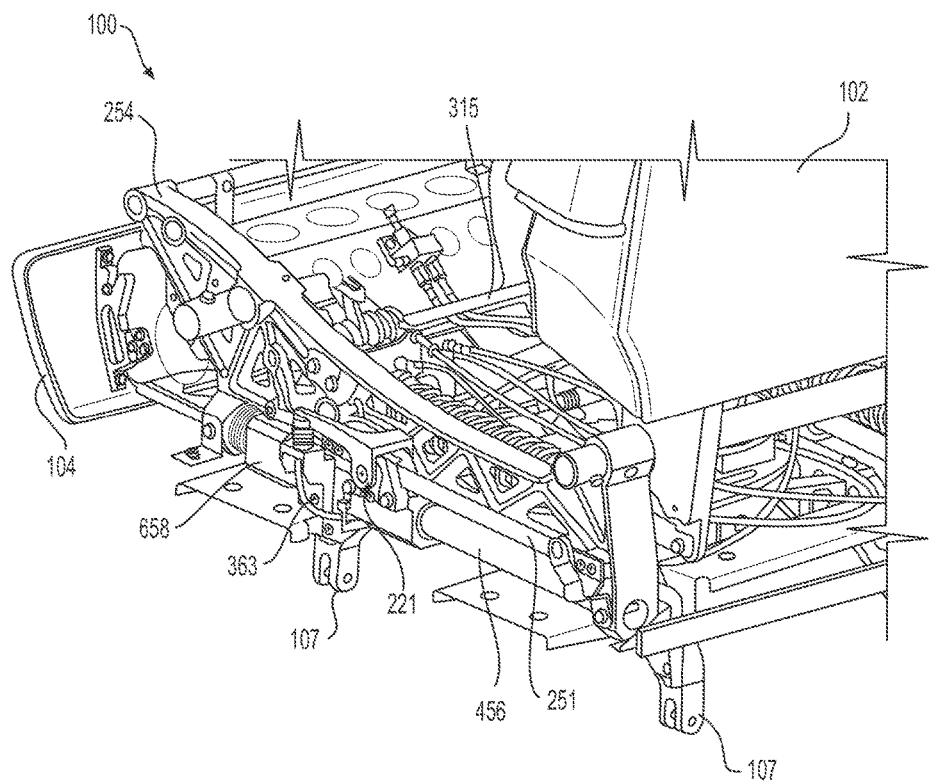
FIG. 6 is a perspective view of the seat of FIG. 4.

FIG. 6 is a perspective view of the first side of seat 100 with components removed for viewing the seat's inner workings. First longitudinal brake assembly 221 is mechanically coupled to first track block 658 and is configured around first brake plate 251 for applying brake pressure thereto. Third cable 363 mechanically couples control rod 315 to first longitudinal brake assembly 221, which is further described below in connection with FIGS. 8-13.

Figure 7:
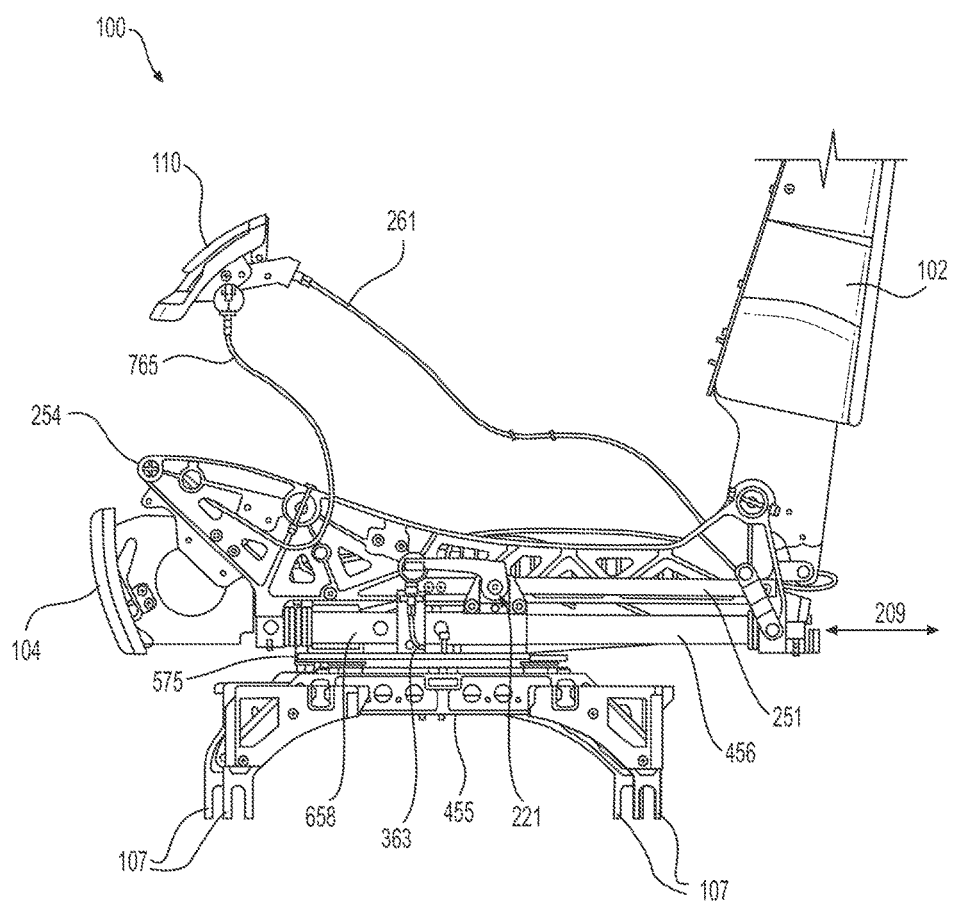
FIG. 7 is a side view of the seat of FIG. 4.

FIG. 7 is a side view of the first side of seat 100 with components removed for viewing the seat's inner workings. A fifth cable 765 is configured to control recline of seat back 102. Fifth cable 765 may be activated by a button, which may be separate and independent from control paddle 110.

Figure 8:
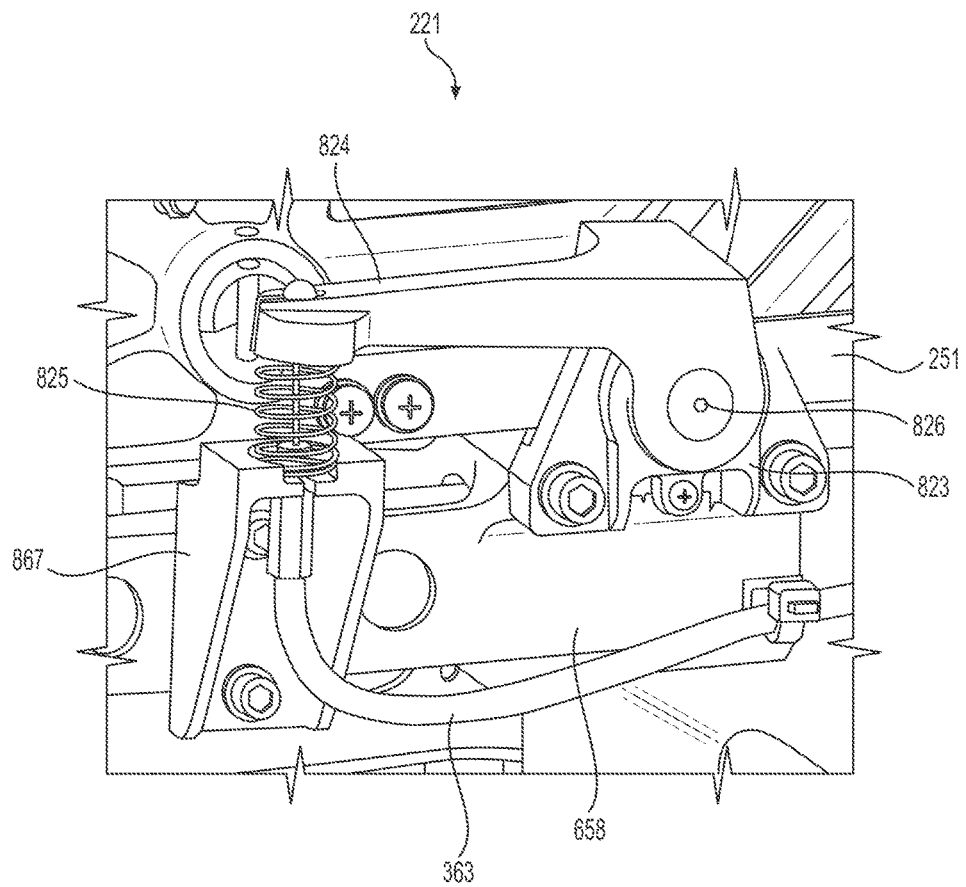
FIG. 8 is a perspective view of a longitudinal brake assembly for use with a seat locking system, in an embodiment.

FIG. 8 is a perspective view of first longitudinal brake assembly 221 mounted to first track block 658. First longitudinal brake assembly 221 includes a caliper housing 823, a lever arm 824, and a biasing mechanism 825. Biasing mechanism 825 may for example be a compression spring concentrically aligned around third cable 363. A bracket 867 constrains biasing member 825 against lever arm 824 and routs third cable 363 to lever arm 824. Biasing mechanism 825 provides an upward force to a first end of lever arm 824, causing clockwise rotation about an axis 826, which moves brake pads located within caliper housing 823 to contact the braking surface of first brake plate 251. Third cable 363 may for example be pulled via control bar 315, FIG. 3 using control paddle 110, thereby pulling downward on the first end of lever arm 824 to rotate counter-clockwise about an axis 826. Together, control paddle 110, first cable 361, control bar 315, third cable 363, and lever arm 824 form a release actuator configured to release brake pads from the braking surface of brake plate 251. In operation, the release actuator may provide counter-clockwise rotation of lever arm 824 to counter act biasing mechanism 825 and unclamp brake pads from the braking surface of first brake plate 251, as further described below in connection with FIGS. 9-13.

Figure 9:
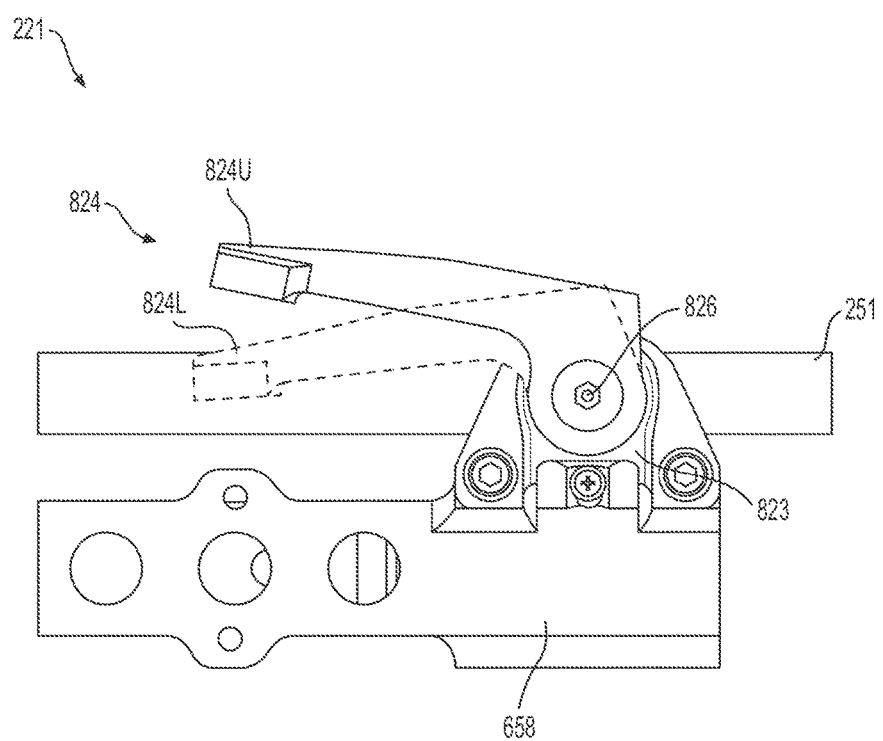
FIG. 9 is a side view of a longitudinal brake assembly showing brake lever positions, in an embodiment.

FIG. 9 shows first longitudinal brake assembly 221 with lever arm 824 mechanically coupled to caliper housing 823. Lever arm 824 is depicted in an upper position 824U with solid lines and in a lower position 824L with dashed lines. As lever arm 824 is moved between upper 824U and lower 824L positions, axis 826 turns clockwise and counter-clockwise, respectively. Referring again to FIG. 8, the upper position may be attained by the upward force of biasing mechanism 825 for example, while the lower position may be attained by the downward pull from third cable 363 for example. In the upper position, brake pads contact or clamp the braking surface of first brake plate 251. In the lower position, brake pads move away from or unclamp the braking surface of first brake plate 251. By default, biasing mechanism 825 keeps lever arm 824 in the upper position (e.g., 824U) such that brake pads remain in contact with the braking surface of first brake plate 251 to prevent motion. The downward pull provided by third cable 363 temporarily releases the brake pads to enable motion. Once tension to third cable 363 is released, biasing mechanism 825 returns lever arm 824 to upper position 824U thereby closing brake pads to prevent motion.

Figure 10:
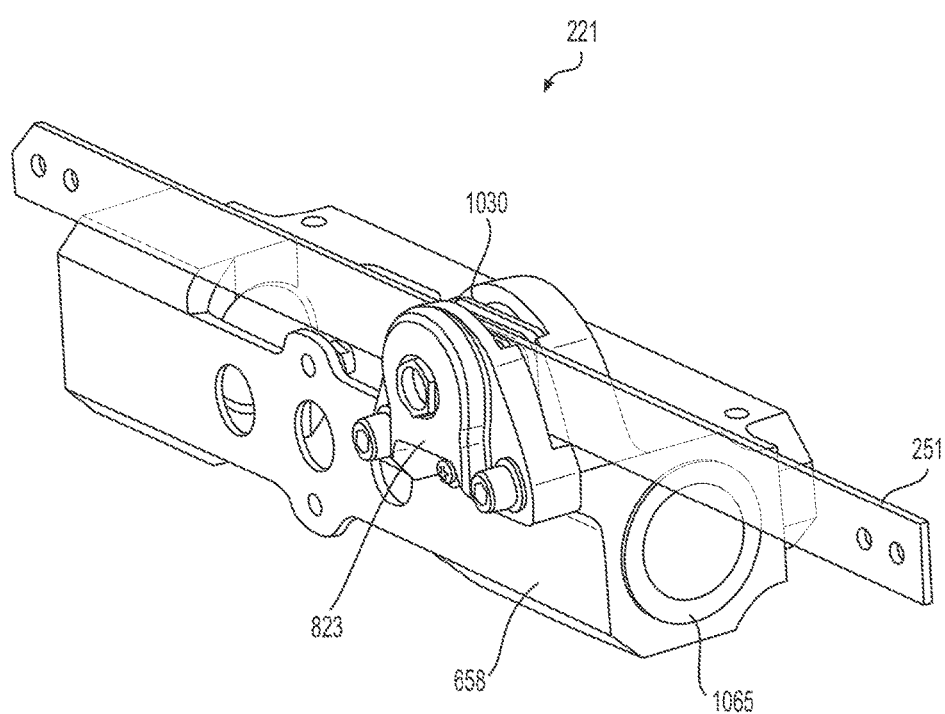
FIG. 10 shows the longitudinal brake assembly of FIG. 9 with the brake lever removed.

FIG. 10 shows first longitudinal brake assembly 221 with lever arm 824 removed to enable viewing of brake pads 1030 positioned about either side of first brake plate 251. FIG. 10 illustrates a bushing 1065 for enabling smooth movement of first track block 658 along a track tube, such as first track tube 456, FIG. 4.

Figure 11:
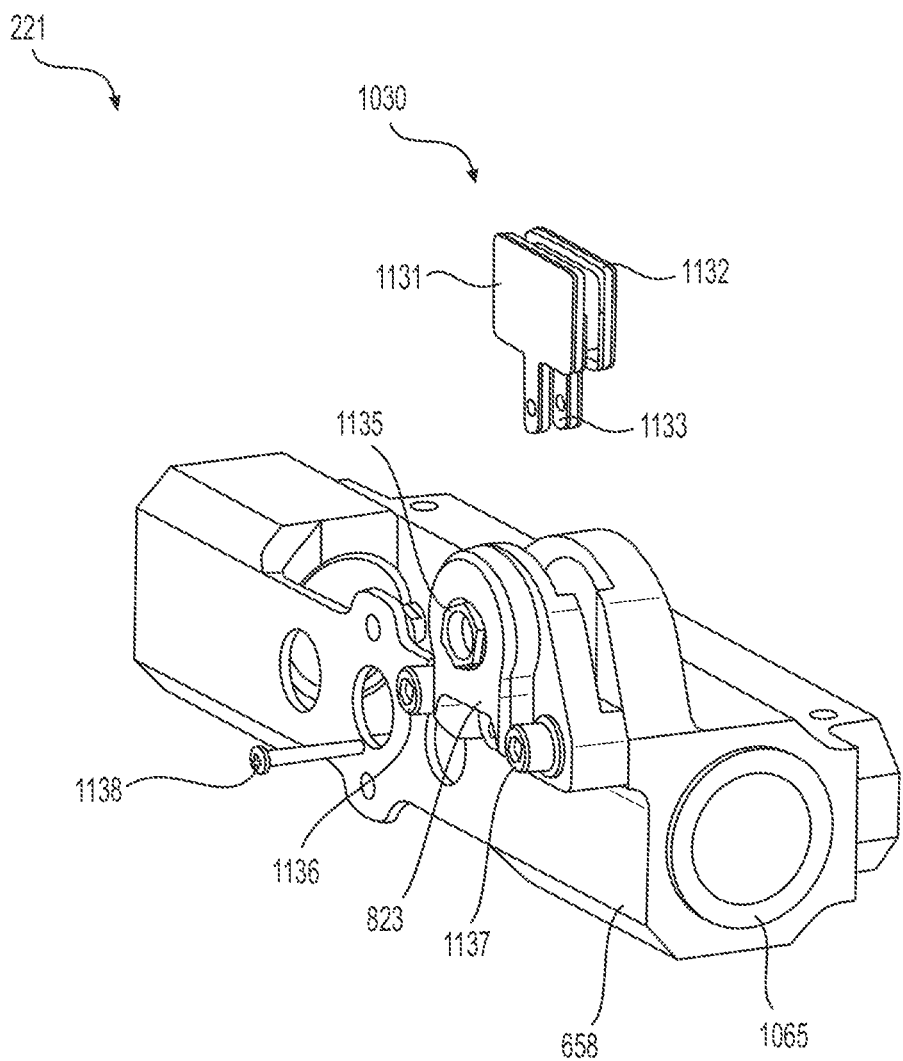
FIG. 11 shows the longitudinal brake assembly of FIG. 11 with brake pads removed for viewing.

FIG. 11 shows first longitudinal brake assembly 221 with brake pads 1030 removed from caliper housing 823. Brake pads 1030 include a first brake pad 1131, a second brake pad 1132, and a leaf spring 1133 positioned between first brake pad 1131 and second brake pad 1132. Leaf spring 1133 acts to push apart first brake pad 1131 and second brake pad 1132. By default, the action of leaf spring 1133 separates first and second brake pad 1131, 1132 into an open or unclamped position. A hex hole connector 1135 is configured for connecting a lever arm, such as lever arm 824, FIG. 8 for example. A first bolt 1136 and a second bolt 1137 may be used to secure caliper housing 823 to first track block 658. A third bolt 1138 is used to hold the brake pads 1030 in caliper housing 823.

Figure 12:
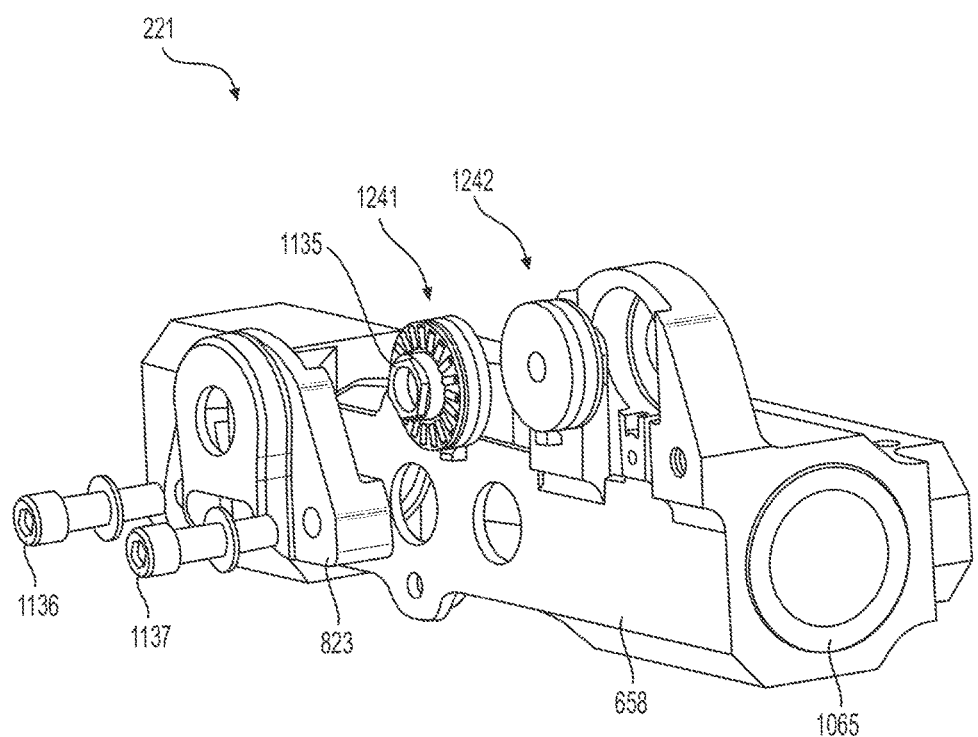
FIG. 12 is an exploded view of the longitudinal brake assembly of FIG. 11.

FIG. 12 is an exploded view of first longitudinal brake assembly 221. First and second bolts 1136, 1137 are removed to free caliper housing 823 from first track block 658 exposing a first caliper assembly 1241 and a second caliper assembly 1242.

Figure 13:
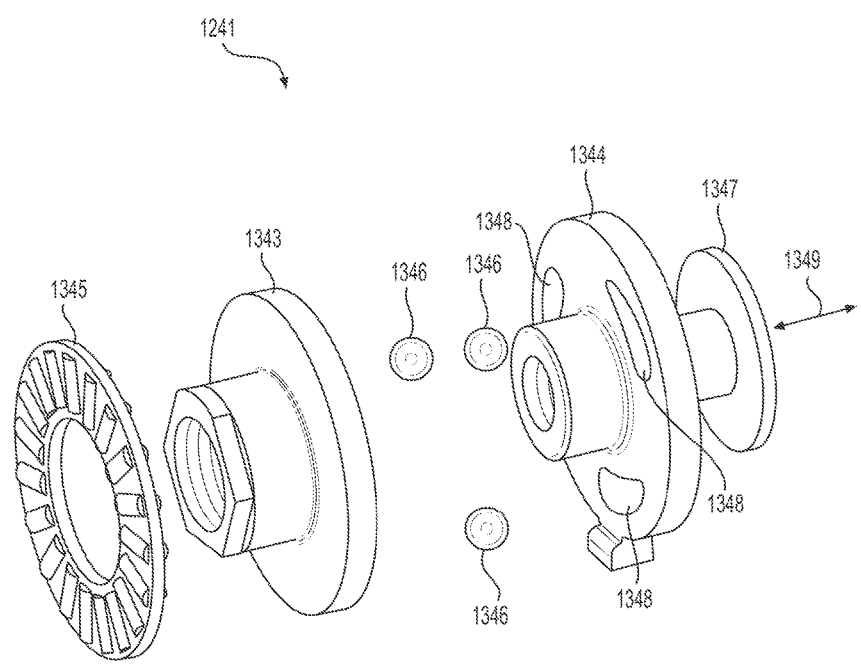
FIG. 13 is an exploded view of a caliper assembly, in an embodiment.

FIG. 13 is an exploded view of first caliper assembly 1241, FIG. 12, and includes a first ramped disc 1343, a second ramped disc 1344, a bearing 1345, balls 1346, and an adjustment screw 1347. Each of first ramped disc 1343 and second ramped disc 1344 have ramped grooves 1348 facing one another that are configured to accept one of balls 1346. The ramped grooves 1348 are configured with a ramped or variable depth, which may resemble the shape of a rain drop for example. First ramp 1343 includes hex hole connector 1135 for connecting to lever arm 824. As lever arm is raised or lowered, first ramp 1343 rotates causing balls 1346 to roll within ramped grooves 1348 of first ramp 1343 and second ramp 1344, such that second ramp 1344 translates along axis 1349 to compress or release brake pads such as first brake pad 1131 and second brake pad 1132, FIG. 11.

Referring again to FIG. 12, first caliper assembly 1241 and second caliper assembly 1242 are configured to translate toward one another when lever arm 824 is rotated to the upper position 824U shown in FIG. 9, and first caliper assembly 1241 and second caliper assembly 1242 are configured to translate away from one another when lever arm 824 is rotated to the lower position 824L shown in FIG. 9. In this manner, rotation of lever arm 824 controls coordinated translation of first and second caliper assembly 1241, 1242, thereby moving first and second brake pads 1131, 1132 together or apart for contacting or releasing, respectively, the braking surface of first brake plate 251.

Figure 14:
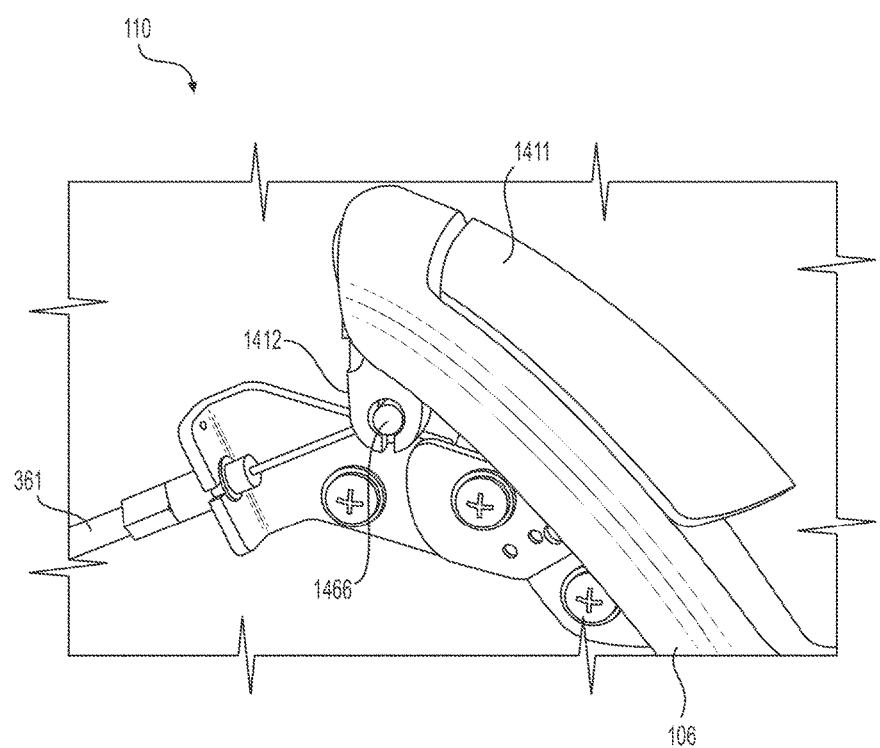
FIG. 14 is a perspective view of a control paddle assembly for use with a seat locking system, in an embodiment.

FIG. 14 is a perspective view of control paddle 110, FIG. 1. Control paddle 110 is shown mechanically coupled to right armrest 106, FIG. 1 with portions removed in FIG. 14 for viewing the inner workings of control paddle 110. Control paddle 110 includes a handle 1411 and a cantilever 1412. Cantilever 1412 is mechanically coupled to an end 1466 of first cable 361. A user may lift handle 1411, as depicted in FIG. 15, causing cantilever 1412 to pivot, thereby pulling on end 1466 of first cable 361.

Figure 15:
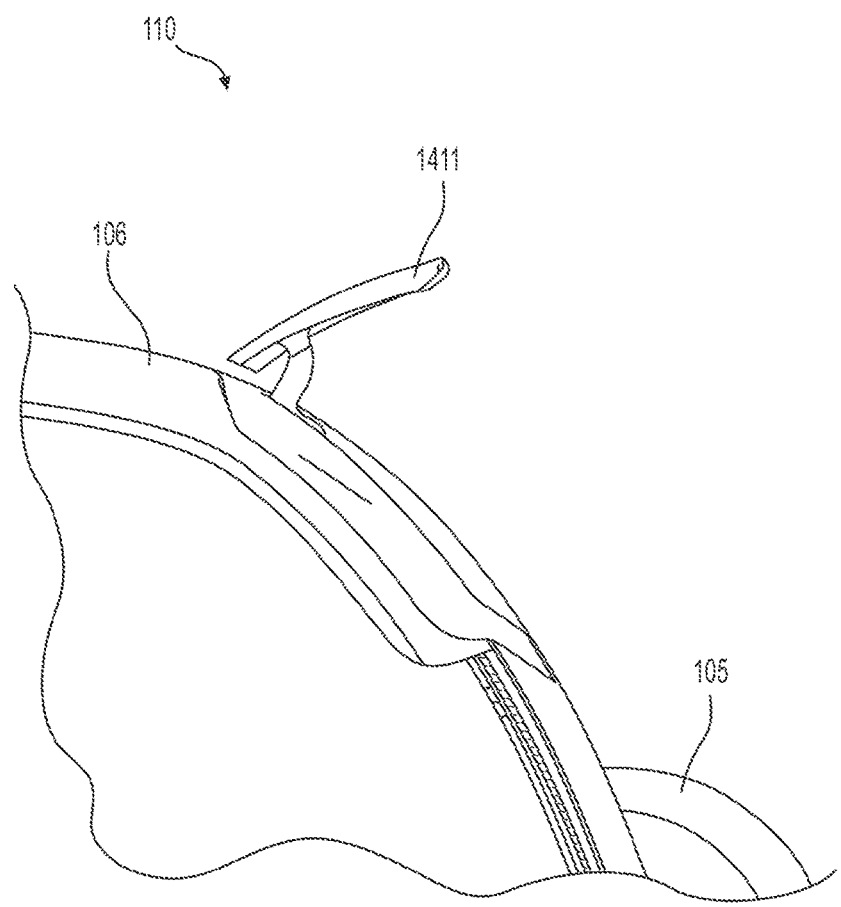
FIG. 15 is a side view the control paddle of FIG. 1 in the activated position.

FIG. 15 is a side view of control paddle 110 with handle 1411 lifted in the activated position. When lifted to the activated position, control paddle 110 pulls first cable 361 to rotate control bar 315, thereby pulling additional cables, including but not limited to second cable 362 to release second longitudinal brake assembly 322, third cable 363 to release first longitudinal brake assembly 221, and fourth cable 364 to release lateral brake assembly 380.

Figure 16:
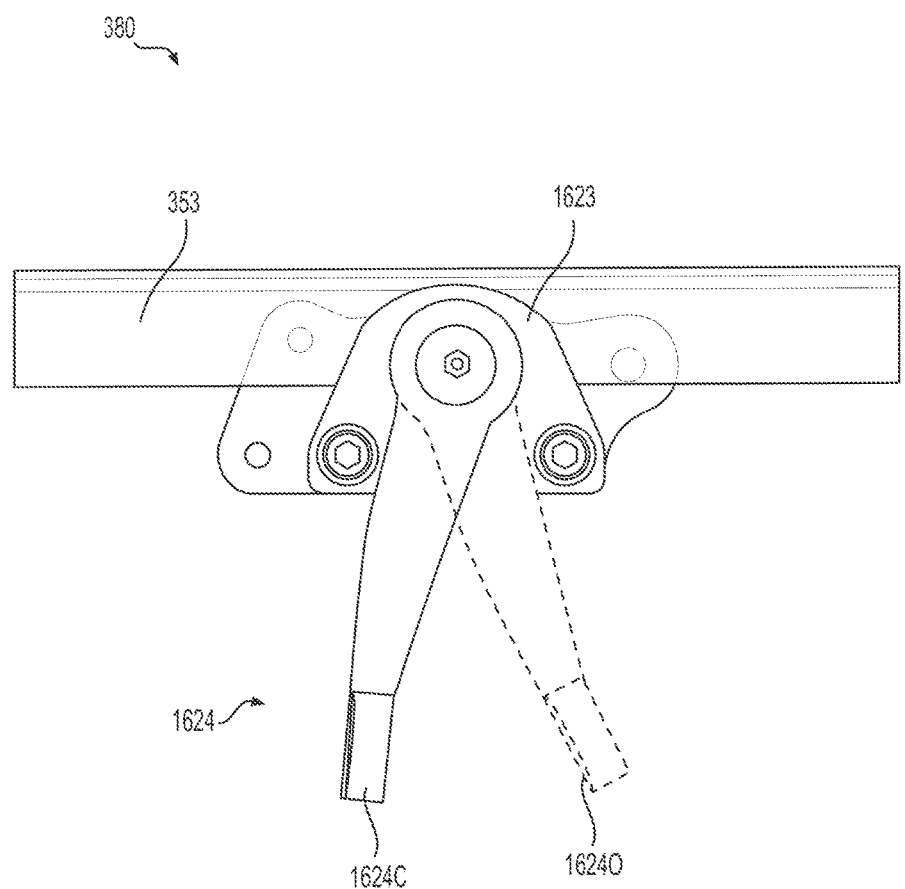
FIG. 16 is a top view of a lateral brake assembly for use with a seat locking system, in an embodiment.
Figure 17:
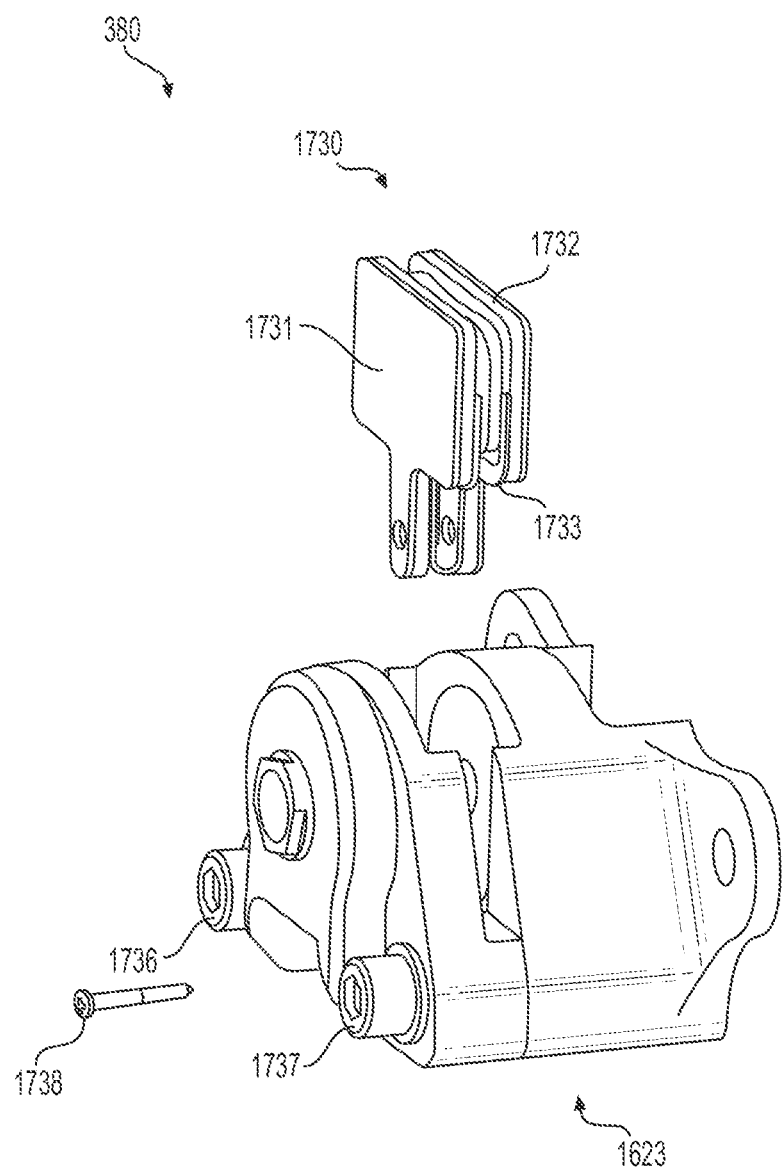
FIG. 17 is a perspective view of the lateral brake assembly of FIG. 16 with brake pads removed for viewing.
Figure 18:
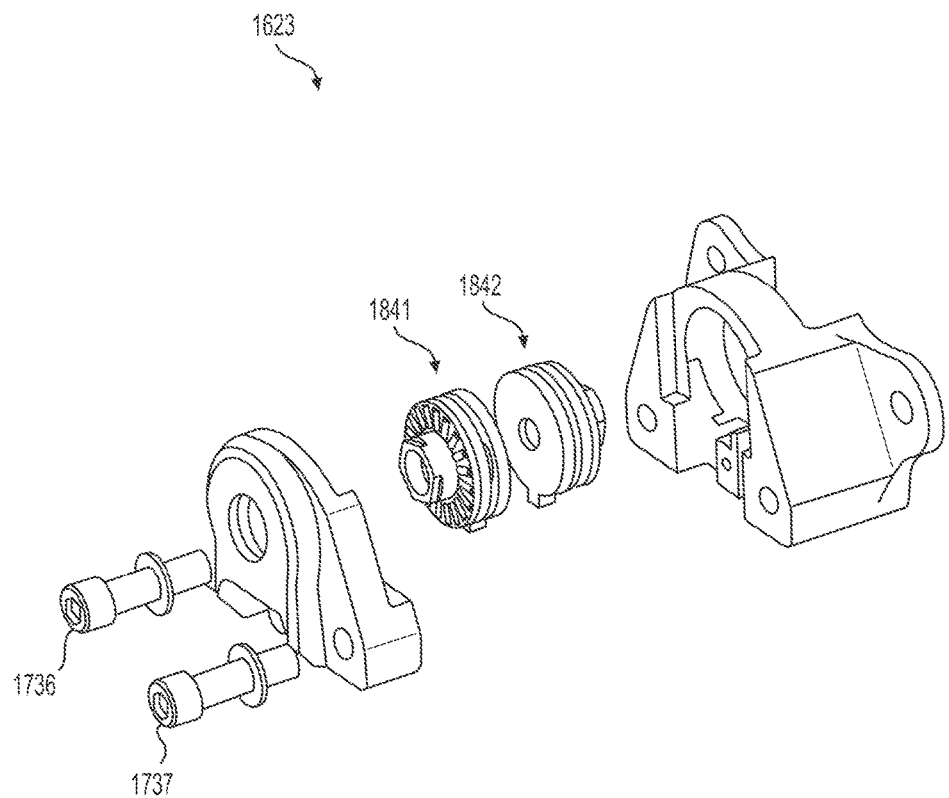
FIG. 18 is an exploded view of the lateral brake assembly of FIG. 17.

FIG. 16 is a top view of lateral brake assembly 380, FIG. 3, which includes a caliper housing 1623, a lever arm 1624 in a closed position 1624C shown with solid lines corresponding to closed brake pads, and in an open position 1624O shown with dashed lines corresponding to open brake pads. Lateral brake assembly 380, which is functionally similar to first longitudinal brake assembly 221, is configured to squeeze brake pads by default with a biasing mechanism, similar to biasing mechanism 825, FIG. 8. The brake pads may apply braking pressure to a braking surface of third brake plate 353. When control paddle 110 is lifted, fourth cable 364 is pulled via control bar 315 to pull lever arm 1624 from the closed position 1624C to the open position 1624O thereby releasing the brake pads from third brake plate 353. Brake pads of lateral brake assembly 380 are shown in FIG. 17 and caliper assemblies are shown in FIG. 18. FIGS. 16-18 are best viewed together with the following description.

FIG. 17 is a perspective view of lateral brake assembly 380, FIG. 3 with brake pads 1730 removed from caliper housing 1623. A first bolt 1736 and a second bolt 1737 may be used to secure caliper housing 1623 together. Brake pads may be released for removal from caliper housing 1623 by a third bolt 1738. Brake pads 1730 are an example of brake pads 1130, FIG. 11 and include a first brake pad 1731, a second brake pad 1732, and a leaf spring 1733 positioned between first brake pad 1731 and second brake pad 1732. Leaf spring 1733 acts to push apart first brake pad 1731 and second brake pad 1732. By default, the action of leaf spring 1733 separates first and second brake pads 1731, 1732 into an open position configured to accept a brake plate, such as third brake plate 353.

FIG. 18 is an exploded view of lateral brake assembly 1623. First and second bolts 1736, 1737 are removed to open caliper housing 1623 exposing a first caliper assembly 1841 and a second caliper assembly 1842, which are examples of first caliper assembly 1241 and second caliper assembly 1242, FIG. 12.

Embodiments of the present disclosure provide improved mechanisms to precisely and rapidly cease seat movement without unwanted noise. Advantages over prior art systems include no slip, no noise, and an increased number of potential seat positions.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

We claim:

1. A system for securing a moveable device in a plurality of positions, the system comprising:
the movable device arranged movably about a member, the member extending along a linear path;
a lever arm configured with a biasing mechanism to engage a brake pad against the member to prevent movement by the moveable device;
a ramped disc configured for pushing the brake pad to engage the member when rotated by the lever arm; and
a release actuator having a cable configured for pulling the lever arm to counteract the biasing mechanism and disengage the brake pad from the member, thereby enabling motion of the moveable device that is: (i) along, or (ii) in parallel with the linear path.

2. The braking system of claim 1, wherein the moveable device is an aircraft seat.

3. The braking system of claim 1, wherein the biasing mechanism is a spring.

4. The braking system of claim 1, wherein the release actuator further comprises a control paddle configured to pull the cable.

5. The braking system of claim 1, wherein the member is a brake plate that is aligned in the linear path.

6. The braking system of claim 5, wherein the ramped disc is configured for pulling the brake pad to disengage the brake plate when counter-rotated by the lever arm.

7. A locking system for an adjustable seat comprising:
a releasable clamping device, the device being mechanically coupled to a seat base and configured to receive a clampable brake receiving member on the adjustable seat that slides on track tubes,
wherein the releasable clamping device is a caliper brake and the clampable brake receiving member is a brake plate;
the caliper brake includes a lever arm that rotates a ramped disc for engaging a brake pad with the brake plate, and counter-rotates the ramped disc for releasing the brake pad from the brake plate;
a biasing mechanism maintaining the clamping device in engagement with the brake receiving member when in an engaged state; and
a release actuator for releasing the clamping device from the brake receiving member by acting against the biasing mechanism to enable a released state for sliding the adjustable seat.

8. The locking system of claim 7, wherein the biasing mechanism is a spring.

9. The locking system of claim 7, wherein the biasing mechanism presses the lever arm to rotate the ramped disc and maintain the caliper brake in the engaged state.

10. The locking system of claim 7, wherein the release actuator further comprises a cable mechanically coupled to the lever arm, the cable being adapted to pull the lever arm against the biasing action of the biasing mechanism and counter-rotate the ramped disc to accomplish the released state.

11. A braking system for adjusting position of an articulating aircraft seat, comprising:
a caliper mechanically coupled to a seat base, the caliper having an arm configured to rotate a ramped disc for pushing a brake pad against a braking surface and to counter-rotate the ramped disc for releasing the brake pad from the braking surface;
a spring mechanically coupled to the caliper for biasing the arm to maintain the brake pad against the braking surface in an engaged state, thereby locking the seat in place; and
a cable mechanically coupled to the caliper and configured to counteract the spring to unlock the seat for moving.

12. The locking system of claim 11, wherein the braking surface is aligned in parallel with a linear direction of movement for adjusting position of the articulating aircraft seat.

13. The locking system of claim 11, wherein position of the brake pad against the braking surface is unrestricted to enable incremental position adjustments of any distance less than the length of the braking surface.

* * * * *